Dec. 5, 1933.  C. M. SNYDER  1,938,302
DISHWASHING MACHINE
Filed Nov. 23, 1931
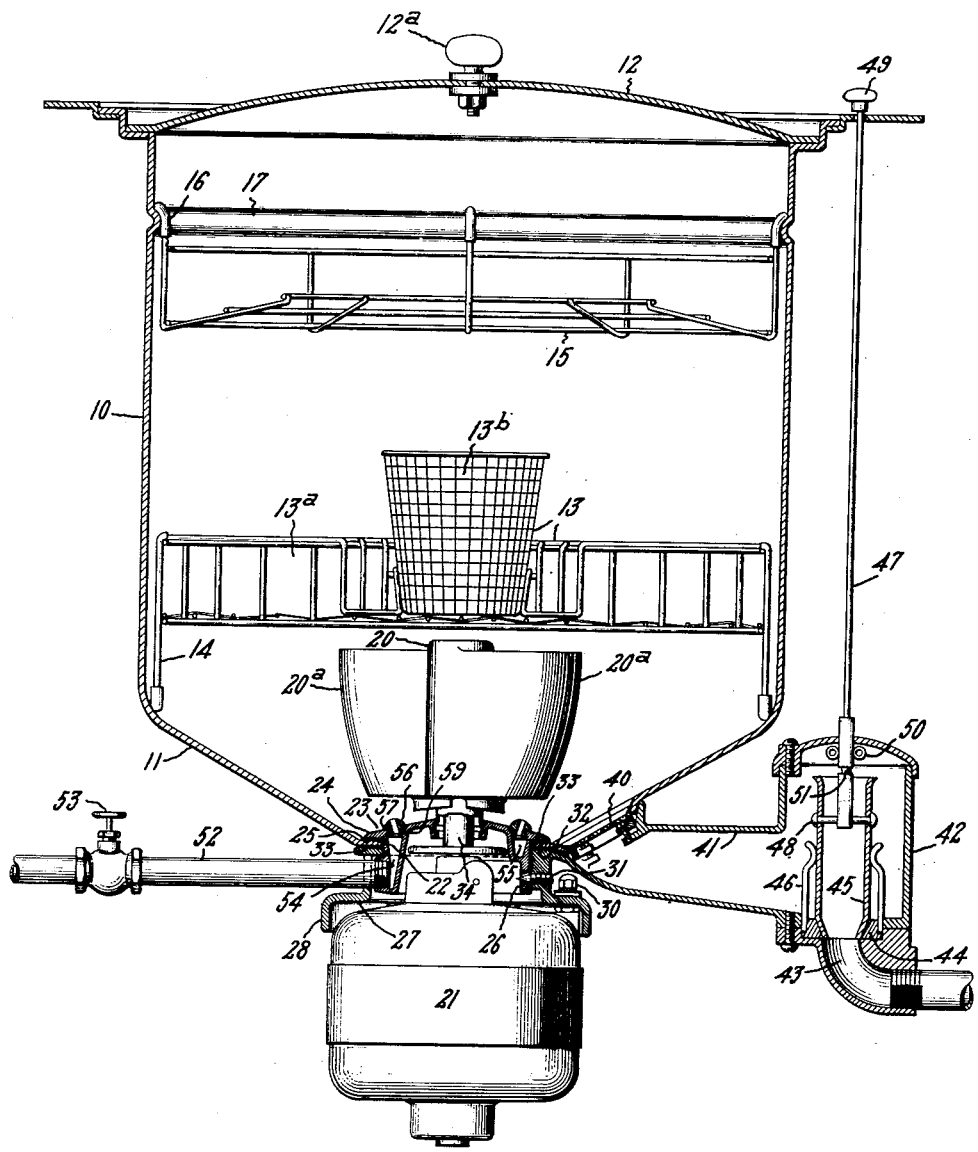
Inventor:
Carl M. Snyder,
by Charles E. Tullar
His Attorney.

Patented Dec. 5, 1933

1,938,302

UNITED STATES PATENT OFFICE 1,938,302

DISHWASHING MACHINE

Carl M. Snyder, Glen Ellyn, Ill., assignor to Walker Dishwasher Corporation, a corporation of New York Application November 23, 1931
Serial No. 576,672

4 Claims. (Cl. 141—9)

My invention relates to machines for washing dishes and the like and has for its object the provision of an improved device of this character whereby dishes and other utensils can be thoroughly washed and rinsed.

More specifically, my invention contemplates the provision of means for circulating a washing fluid over the dishes and other utensils in the washing chamber or vat whereby the dishes are thoroughly washed, and further, the provision of means whereby a rinsing fluid, such as fresh water, can be admitted under pressure to the washing chamber under conditions such that the dishes and other utensils will be thoroughly rinsed.

In carrying my invention into effect in one form thereof, I provide a suitable dish and like utensil supporting rack in a washing chamber or vat and beneath the rack I place an impeller arranged to hurl a washing fluid upwardly and outwardly through the rack so as to effect a thorough cleansing action on the utensils in the rack. In addition, suitable means are provided for directing fresh rinsing water into the vat in such a manner as to be engaged by the impeller whereby it is thrown upwardly and outwardly in spray form through the rack so as to thoroughly rinse the utensils supported therein.

For a more complete understanding of my invention reference should be had to the accompanying drawing in which the single figure is a vertical elevation mainly in section of a dishwashing machine embodying my invention.

Referring to the drawing, I have shown my invention in one form in connection with a dishwashing machine comprising an upright cylindrical washing chamber or vat 10 for receiving dishes and utensils to be cleansed, and also some suitable washing fluid, such as hot cleansing water. As shown, the vat 10 is provided with an inverted frusto-conical bottom wall 11 preferably formed integrally with the side walls of the vat. While the vat together with its bottom wall may be made of any suitable material, I prefer to form them from some suitable sheet metal, such as a rust-resisting steel, which preferably will be plated or enameled. A suitable removable metallic sheet metal cover 12 is provided for the vat 10, this cover being provided with a handle member 12a whereby it can be conveniently removed and replaced.

A suitable utensil supporting open-work tray or basket 13 is provided in the lower portion of the vat 10 and is removably supported therein upon the marginal edge portions of the bottom wall 11 by means of suitable legs 14. A suitable openwork utensil supporting tray 15 is arranged in the upper portion of the vat, this latter basket having at its upper edge supporting arms 16 arranged when the basket is in position in the vat to engage and rest upon a ledge 17 formed in the vat. This ledge may be and, as shown, is formed as an inwardly projecting bead shaped from the material forming the side walls of the vat; if desired, this ledge may be formed on a separate member (not shown) overhanging the mouth of the vat. While these trays 13 and 15 may have any suitable well-known construction, the lower tray preferably will be provided with two compartments 13a and 13b arranged substantially concentrically of each other, the outer compartment 13a serving to receive platters, plates, saucers, side-dishes, salad bowls and like utensils, while the inner compartment 13b is utilized for receiving knives, forks, silverware, etc.; the upper basket preferably will be arranged to receive glasses, bowls, cups, etc.

It will be understood that these trays 13 and 15 can easily be lifted and so can be loaded and unloaded in or out of the vat as is most convenient. It will also be understood that the vat 10 will be provided with a suitable supporting casing or framework (not shown) so as to be held in substantially vertical position and at a convenient height.

In the lower portion of the vat 10 and preferably arranged so as to be substantially embraced by the bottom wall 11 is a suitable impeller 20 which preferably will be driven by a suitable electric motor 21.

It will be understood that the impeller 20 will be provided with blades 20a which may have any suitable shape, the important feature being that the blades be given a shape such that the cleansing fluid in the lower portion of the vat will be thrown upwardly and outwardly in an efficient manner through the dish supporting trays 13 and 15 by the rotary motion of the impeller. The impeller together with its blades will be formed from some suitable material, such as cast aluminum or pressed steel.

It will be observed that the bottom wall 11 of the vat is provided with a centrally arranged circular opening 22 formed therein. In this opening is mounted a bushing 23. The bushing is provided with a substantially horizontal annular flange portion 24 which rests upon the inner surface of a suitable substantially flat supporting ledge 25 formed from the material of the bottom wall surrounding the opening 22.

This bushing is also provided with a depending cylindrical portion 26 extending downwardly through the opening 22.

The bushing 23 serves to carry a suitable frame 27 for supporting the impeller motor 21, this frame having an outwardly projecting flange or apron portion 28 to which the motor is detachably secured by some suitable means, such for example as bolts 30 secured to the upper portion of the motor frame and passed through apertures provided for them in the apron.

It will be observed that the frame 27 is provided above the apron 28 with a cylindrical portion which surrounds and which fits rather closely the cylindrical depending portion 26 of the bushing 23. This portion of the motor frame is detachably secured to the bushing by means of suitable clamping set-screws 31, only one of which is shown in the figure, disposed circumferentially about the frame.

The upper portion of the motor supporting frame 27 is provided with a substantially flat annular surface 32 which cooperates with the flange portion 24 of the bushing 23 so as to clamp the annular ledge 25 of the bottom wall 11 between them. Interposed and firmly clamped between the upper and lower surfaces of this ledge and the lower surface of the flange 24 and the upper surface 32 of the motor frame respectively are suitable washers or gaskets 33 arranged so as to form a water-tight joint at the opening 22 formed in the bottom wall 11.

The impeller driving motor 21 is mounted upon the frame 27 so that its shaft 34 is substantially coaxial with the axis of the bushing 23 and with the vertical central axis of the vat 10. The motor shaft 34 may be mechanically connected to the impeller 20 by any suitable means. It is believed to be unnecessary to describe in detail the mechanical driving connection between the motor shaft and the impeller in that this connection forms no part of the present invention. It is believed to be sufficient to state that this connection will include suitable means providing for a water tight seal or joint between the shaft and impeller whereby it will be impossible for any of the cleansing or rinsing fluids in the vat to pass down the motor shaft to the motor frame.

A suitable drainage outlet 40, preferably screened, is provided in the bottom of the vat 10 and preferably is arranged as close to the bottom of the inclined wall of the bottom 11 as is practical. Communicating with the outlet is a drainage conduit 41 which as shown in the figure terminates in a suitable valve housing 42. The conduit 41 while it may be a separate pipe preferably and as shown will be formed integrally with the motor supporting frame 27. The valve housing 42 is provided with a drainage opening 43 surrounded by a valve seat 44. Cooperating with this valve seat is a tubular valve 45 positioned vertically within the valve housing and arranged for vertical opening and closing movements therein. Preferably the lower end of the valve which engages the valve seat will be tapered somewhat, the valve seat, of course, being given a corresponding shape so as to interfit with the tapered valve. As shown, suitable upright resilient guide members 46 secured in any suitable manner in the lower portion of the valve housing are provided for the valve 45.

The upper edge of the tubular valve 45 extends somewhat above the upper edge of the drainage opening 40 and thereby provides an overflow passage for the cleansing fluid or other liquid introduced into the vat. This arrangement, as will be readily understood, accurately regulates the level of the liquid which should be maintained in the vat to effect efficient cleansing.

A suitable drain valve operating member is provided, this member as shown comprising a vertically disposed operating rod 47. The lower end of this rod extends into the valve housing where it is mechanically connected with valve by a suitable pin connection 48. The upper end of the rod 47 extends to a suitable height for convenience of operation, and may if desired be provided with an operating knob or handle 49. Preferably, suitable spring clamp members 50 will be provided to engage the lower end portion of the rod when it is raised to its upper valve opening position so as to lock the rod in this position. As shown, these members 50 are arranged in the valve housing on opposite sides of the valve rod so that when the valve rod is in its upper position, they will be received in a suitable annular seat 51 provided for them in the lower end of the rod. It will be understood that these springs will be sufficiently strong to hold the valve in its open position, but will be sufficiently yielding to permit the valve to be easily closed by the attendant.

A water inlet conduit or pipe 52, provided with a suitable control valve 53 and connected with a suitable source of water supply, communicates with the interior of the vat by means of a suitable passageway 54 provided in the bushings 23. As shown, the pipe 52 is threaded into a suitable opening provided for it in the bushing so that it opens directly into the passageway 54. This passageway 54 communicates with an annular channel or groove 55 provided in the upper portion of the bushing 23. This channel, as shown, is arranged substantially concentrically with the motor shaft and with the vertical axis of the vat.

The water which is directed from the passageway 54 into the annular channel 55 is lead to the interior of the vat through suitable nozzle members 56 which are arranged in the busing so as to provide communication between the channel 55 and the interior of the vat.

The nozzles, as shown, are provided with heads which rest in suitable seats 57 provided for them in the upper surface of the bushing 23. The nozzles are further provided with cylindrical portions depending from the head and tightly received in apertures 59 communicating with the annular passageway 55.

It will be understood that any suitable number of these nozzles may be provided and that these nozzles provide the only communication between the annular passageway 55 and the vat, the annular passageway otherwise being closed to the vat.

The passageways of the nozzles 56 are arranged to direct the water issuing therefrom in diverging streams through the paths swept by the blades 20a of the impeller.

This arrangement of the nozzle members for directing diverging streams of fresh water into the paths swept by the impeller blades is a very important feature of my invention in that the columns of water thus directed toward the impeller will be engaged by the rapidly moving blades and hurled upwardly and outwardly through the dish supporting racks with considerable violence and in spray form. This constitutes a very simple and efficient means for admitting fresh rinsing water under pressure into the washing vat under such conditions that the dishes will be thoroughly rinsed.

In the operation of my dishwashing machine, it will be understood that the dishes and like utensils to be cleansed will be placed in their respective supporting trays or baskets 13 and 15. Such utensils as platters, plates, saucers, sidedishes, salad bowls, etc. will be positioned, preferably edgewise, within the compartment 13a of the tray 13, whereas small bowls, glasses, cups, etc. will be placed in upper tray 15.

Knives, forks, silverware, etc. preferably will be positioned in the utensil receiving compartment 13b of the tray 13. As has been pointed out, these utensils may be placed in the trays either with the trays within or without the vat as is most convenient to the attendant.

The requisite amount of cleansing water will be supplied to the interior of the vat by opening the valve 53 in the supply pipe 52, the water flowing into the vat through the nozzles 56, the proper water level for efficient cleansing being controlled by the overflow valve 45. It will be understood, of course, that a quantity of water less than maximum as set by the valve may be supplied to the vat. If desired, soap or some other suitable cleansing substance may be added to the water or may be applied directly to the utensils to be cleansed.

When the dishes and other utensils have been placed in their respective trays and the requisite amount of water has been supplied to the vat and the lid or cover 12 has been closed, the motor 21 may be energized so as to effect rotary motion of the impeller 20. This operation will cause the cleansing fluid in the lower portion of the vat to be thoroughly circulated upwardly and outwardly through the open-work dish supporting trays and against the dishes therein. It will be understood, of course, that the motor 21 will be provided with a suitable controling switch or push button station arranged in a position readily accessible to the attendant so that the motor may be conveniently controlled.

The operation of the impeller will be continued until the dishes have been thoroughly cleansed, after which the motor 21 may be deenergized. The valve 45 will then be opened by lifting the handle 49 so as to allow the soiled water to be drained from the outlet 40 into the drainage conduit 41.

In order to rinse the utensils with clean fresh water, the motor 21 will be reenergized, and the water inlet valve 53 again will be opened so as to permit water under pressure to flow upwardly through the nozzle members 56. Water issuing from the nozzles 56 under pressure will be forced directly upwardly into the vat in a plurality of diverging streams and within the paths swept by the impeller blades 20a. The impeller as it is being rotated at a considerable speed will engage the streams of water issuing from the nozzles and will cause them to be deflected upwardly and outwardly through the racks 13 and 15 and about and over the utensils supported therein as a very fine spray and under considerable pressure. This operation will be continued until the dishes have been thoroughly rinsed. It will be understood that this rinsing operation will also serve to clean the interior of the vat and other parts of the machine mounted and arranged therein. Preferably, the drain valve 45 will be held open during the rinsing operation so as to permit the rinsing water circulated through the vat to pass into the drainage conduit 41.

After the dishes have thus been rinsed, the trays 13 and 15 and dishes therein may be removed, or they may be left in place in the vat until the dishes and utensils are thoroughly dry after which they may be removed.

The rinsing or spray device may also be used to considerable advantage in giving the utensils a preliminary spraying or rinsing before they are subjected to the direct washing action of the impeller. Thus, the rinsing device may, if desired, perform the important function of thoroughly wetting the utensils and of removing a great deal of the foreign matter adhering to them before the cleansing water is allowed to accumulate in the vat to receive the more positive action of the impeller itself. To effect this preliminary rinsing, the impeller will be rotated and water under pressure will be admitted to the vat through the nozzles 56 so that water issuing from the nozzles, as before, will be sprayed upwardly and outwardly through the trays 13 and 15; during this operation it is also preferable to hold the drain valve 45 in its open position so that a large portion of the grease and food soil removed from the dishes by the spray will flow from the vat and down through the drain. Of course, the valve 45 should be closed when it is desired to allow fresh water to accumulate in the vat for the subsequent washing action of the impeller and during this operation the impeller should be stopped in order that the proper amount of cleansing water can be regulated by the valve.

While I have shown a particular embodiment of my invention, it will be understood, of course, that I do not wish to be limited thereto since many modifications may be made and I, therefore, contemplate by the appended claims to cover any such modifications as fall within the true spirit and scope of my invention.

What I claim as new and desire to secure by Letters Patent of the United States, is:—

1. A machine for washing dishes and the like comprising a washing vat, a dish-supporting rack in said vat, a drain communicating with the lower portion of said vat, an impeller in the lower portion of said vat provided with blades arranged to throw a cleansing fluid supplied to and retained in said vat upwardly and outwardly through said dish-supporting rack so as to effect a washing action on the dishes supported therein, a plurality of nozzles beneath said impeller arranged so that when said drain is opened to empty said vat fluid issuing from them is directed upwardly in streams into the paths of said impeller blades whereby said streams are broken up and hurled upwardly and outwardly in spray form through said dish-supporting rack so as to effect a cleansing action on the dishes supported therein, and fluid supply conduit means communicating with said nozzles.

2. A dishwashing machine comprising a vat for receiving articles to be cleansed and a cleansing fluid, a rack in said vat for supporting said articles to be cleansed, a drain valve for said vat arranged when closed to allow fluid supplied to said vat to accumulate in a pool in the lower portion thereof and when open to allow fluid supplied to said vat to drain from said vat, nozzle means in the lower portion of said vat for introducing cleansing fluid into said vat, said nozzle means being arranged to supply said fluid as a free stream when said drain valve is open and when said drain valve is closed to supply said fluid to the pool that accumulates in the lower portion of said vat, and an impeller in said vat below said rack having moving blades arranged to engage said free stream of fluid when said drain valve is open so as to break it into fine spray form and hurl it upwardly and outwardly through said rack, and when said drain valve is closed to provide for the accumulation of fluid in said vat to engage the accumulated pool of fluid so as to hurl it upwardly and outwardly through said rack.

3. A dishwashing machine comprising a washing vat, a dish supporting rack in said vat above the bottom wall thereof, an impeller arranged in said bottom wall so that washing fluid in the bottom of said vat is hurled upwardly and outwardly when said impeller is rotated, an annular fluid receiving channel below said impeller substantially coaxial with its axis of rotation, a plurality of nozzle members providing communication between said channel and the interior of said vat, said channel being otherwise closed to said vat, and said nozzle members being arranged to direct fluid introduced to said channel under pressure upwardly in streams and in the paths swept by the blades of said impeller so as to be hurled in spray form upwardly and outwardly through said rack, means for supplying said channel with a rinsing fluid and means for rotating said impeller.

4. A dishwashing machine comprising a vat, a dish supporting rack in said vat, an impeller within said vat below said rack and having blades arranged to throw a cleansing fluid placed within the bottom of said vat upwardly and outwardly through said rack, means for rotating said impeller, a conduit for conducting a rinsing fluid to said vat, a conduit below said impeller communicating with said first conduit and having a plurality of apertures communicating with said vat arranged to direct said rinsing fluid supplied to said vat as a plurality of streams against the moving blades of said impeller in such directions as to be deflected therefrom upwardly and outwardly through said rack, and drainage means communicating with the lower portion of said vat.

CARL M. SNYDER.